US012249882B2

(12) United States Patent
Boubaker et al.

(10) Patent No.: US 12,249,882 B2
(45) Date of Patent: Mar. 11, 2025

(54) STATOR WINDING ARRANGEMENT

(71) Applicants: Centre National De La Recherche Scientifique, Paris (FR); Safran Electrical & Power, Buckinghamshire (GB); Safran Landing Systems, Vélizy-Villacoublay (FR)

(72) Inventors: Nadhem Boubaker, Buckinghamshire (GB); Daniel Matt, Castelnau-le-Lez (FR); Florent Nierlich, Antony (FR)

(73) Assignees: CENTRE NATIONAL DE LA RECHERCHE SCIENTIFIQUE, Paris (FR); SAFRAN ELECTRICAL & POWER, Buckinghamshire (GB); SAFRAN LANDING SYSTEMS, Velizy-Villacoublay (FR)

( * ) Notice: Subject to any disclaimer, the term of this patent is extended or adjusted under 35 U.S.C. 154(b) by 662 days.

(21) Appl. No.: 17/594,221

(22) PCT Filed: Apr. 8, 2020

(86) PCT No.: PCT/IB2020/000337
§ 371 (c)(1),
(2) Date: Oct. 7, 2021

(87) PCT Pub. No.: WO2020/208425
PCT Pub. Date: Oct. 15, 2020

(65) Prior Publication Data
US 2022/0140684 A1 May 5, 2022

(30) Foreign Application Priority Data
Apr. 9, 2019 (GB) .................................. 1905046

(51) Int. Cl.
H02K 3/28 (2006.01)
H02K 1/16 (2006.01)
H02K 3/12 (2006.01)

(52) U.S. Cl.
CPC .............. *H02K 3/28* (2013.01); *H02K 1/165* (2013.01); *H02K 3/12* (2013.01); *H02K 2213/03* (2013.01)

(58) Field of Classification Search
CPC ............ H02K 3/28; H02K 1/165; H02K 3/12; H02K 2213/03; H02K 29/03; H02K 21/14;
(Continued)

(56) References Cited

U.S. PATENT DOCUMENTS 4,424,463 A 1/1984 Musil
6,094,011 A 7/2000 Notsu
(Continued)

FOREIGN PATENT DOCUMENTS

CN 106787595 A 5/2017
CN 108809031 A 11/2018
(Continued)

OTHER PUBLICATIONS

International Search Report and Written Opinion dated Aug. 18, 2020, PCT/IB2020/000337, 15 pages.
(Continued)

Primary Examiner — Christopher M Koehler
Assistant Examiner — Riley Owen Stout
(74) Attorney, Agent, or Firm — RANKIN, HILL & CLARK LLP

(57) ABSTRACT

An electrical machine for use in an aircraft, including a rotor. The rotor includes a plurality of rotor poles, and a stator including a plurality of phases. Each respective phase occupies at least one elementary block and the at least one elementary block of each phase includes a set of conductors
(Continued)

of the respective phase wound around a plurality of slots of the respective elementary block in a concentrated winding configuration. A mechanical shift angle between the respective concentrated windings of each pair of adjacent elementary blocks is greater than a rotor pole pitch. The rotor pole pitch is an angle between adjacent poles of the rotor.

18 Claims, 12 Drawing Sheets

(58) Field of Classification Search
CPC .......... H02K 1/278; H02K 3/04; H02K 1/146; H02K 1/16; H02K 3/18; H02K 21/16
See application file for complete search history.

(56) References Cited

U.S. PATENT DOCUMENTS

| | | | | |
|---|---|---|---|---|
| 2002/0175587 A1* | 11/2002 | Vollmer | ................. | H02K 1/146 310/179 |
| 2007/0257566 A1* | 11/2007 | Vollmer | ................. | H02K 3/28 310/180 |
| 2012/0074797 A1* | 3/2012 | Petter | ................. | H02K 21/16 29/598 |
| 2019/0157953 A1* | 5/2019 | Oner | ................. | H02K 15/022 |
| 2019/0229575 A1* | 7/2019 | Richards | ................. | H02K 3/24 |
| 2020/0235624 A1* | 7/2020 | Thomas | ................. | H02K 3/28 |

FOREIGN PATENT DOCUMENTS

| | | |
|---|---|---|
| CN | 208939797 U | 6/2019 |
| DE | 19905748 A1 | 8/1999 |
| EP | 2224578 A1 | 9/2010 |
| WO | 2018/141579 A1 | 8/2018 |

OTHER PUBLICATIONS

Great Britain Search Report dated Sep. 27, 2019, GB1905046.7, 4 pages.
United Kingdom Examination Report issued Mar. 23, 2023, Application No. GB1905046.7, 3 pages.
CN Office action filed in Appl. Serial No. 202080027629.9 mailed Feb. 26, 2024.

* cited by examiner

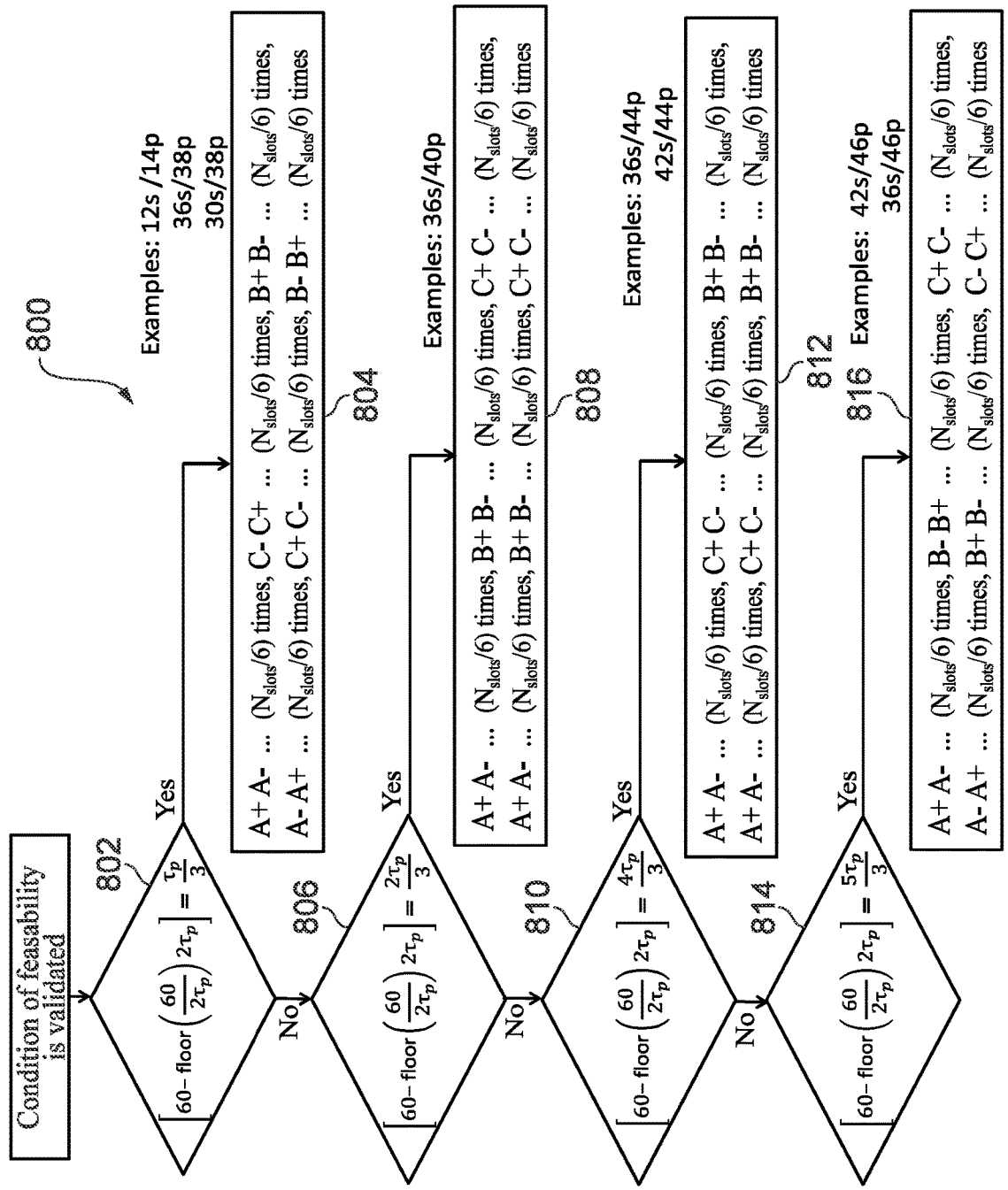

STATOR WINDING ARRANGEMENT

The present invention relates to a stator winding arrangement for an electrical machine for use in an aircraft. In particular, the invention relates to a stator winding arrangement that enables the use of solid conductors, whilst also improving the overall performance of the electrical machine.

BACKGROUND TO THE INVENTION

Electric aircraft propulsion systems typically comprise a fan (propeller), which is connected to an electrical machine. The electrical machine is typically formed of an assembly of magnetic circuit components, comprising a rotor and a stator. As is well known, rotation of the rotor relative to the stator causes interaction of the magnetic field generated by the rotor with windings provided on the stator, generating an induced electromotive force (EMF) and/or electrical current. In a permanent magnet generator, the rotor's magnetic field is produced by permanent magnets, which induces an AC voltage in the stator windings as the stator windings pass through the moving magnetic field of the permanent magnet.

The stator may be provided with a number of different types of winding arrangements depending on the requirements of the aircraft propulsion system. One common type of windings are concentrated windings in which the conductors of each respective phase of the stator are wound around pairs of adjacent slots distributed around the circumference of the stator. However, in conventional concentrated winding arrangements, it is impossible to arrange the windings so as to obtain a unit winding factor as to do so would require the number of slots to equal the number of poles, which is not feasible. Such arrangement leads to an output torque comprising harmonics (noise and ripple) and also to a reduced efficiency. Furthermore, it is very difficult to use solid bar conductors, the use of which can be advantageous for a number of reasons. For example, in a loose round wire, the fill factor within each slot is usually less than 50%, whereas solid bar conductors enable more copper to fit within each slot, enabling more current to flow and thus achieve higher torque. Furthermore, because of a smaller amount of air, and thus less insulation in place, the thermal behaviour of the machine is improved. To use solid bars would be extremely complicated with conventional concentrated windings due to the complex network of jumps between the end windings of each phase.

Therefore, there is a need for a concentrated winding arrangement that improves the overall performance of an electrical machine, and that enables the use of solid conductor bars if required.

SUMMARY OF THE INVENTION

A first aspect of the present invention provides an electrical machine for use in an aircraft, comprising a rotor, wherein the rotor comprises a plurality of rotor poles, and a stator comprising a plurality of phases, wherein each respective phase occupies at least one elementary block, the at least one elementary block of each phase comprising a set of conductors of the respective phase wound around a plurality of slots of the respective elementary block in a concentrated winding configuration, wherein a mechanical shift angle between the respective concentrated windings of each pair of adjacent elementary blocks is greater than a rotor pole pitch, the rotor pole pitch being an angle between adjacent poles of the rotor.

As such, the concentrated windings for each phase of the stator are grouped together in at least one block, spaced apart by an angle that is greater than the angle between adjacent magnets of the rotor. In doing so, the slots for each phase, that is, the slots within each elementary block, are such that they align with the rotor poles, that is, the rotor magnets. Consequently, the flux linkage between the rotor poles and the coils of each phase is maximized, thereby providing a unit winding factor, which results in a more efficient machine. Furthermore, this arrangement enables the use of solid conductors, which further helps to improve the performance of the machine by increasing the fill factor within each slot. This enables more current to flow within each slot, thereby achieving a higher torque, whilst also improving the thermal behaviour of the machine.

The mechanical shift angle may be defined by a function of the rotor pole pitch, a total number of slots in the stator, and a number of elementary blocks in the stator.

The mechanical shift angle may be calculated using a first equation comprising a multiplier and a denominator, wherein the rotor pole pitch, the total number of slots in the stator, and the number of elementary blocks in the stator are variables of the first equation.

The multiplier may be defined as the number of elementary blocks subtracted from the total number of slots to output a first multiplier value, the first multiplier value being multiplied by the rotor pole pitch to output a second multiplier value, the second multiplier value being subtracted from a constant.

The denominator may be the number of elementary blocks.

More specifically, the mechanical shift angle, $\delta_{ph}$, may be calculated by:

$$\delta_{ph} = \frac{360 - \tau_p(N_{slot} - n)}{n}$$

where:
$N_{slot}$ is the total number of slots in the stator;
n is the number of elementary blocks in the stator; and
$\tau_p$ is the rotor pole pitch.

The total number of elementary blocks, n, may be equal to 3 or 6. For example, in a three phase machine, each phase may comprise one elementary block or it may comprise two elementary blocks.

The total number of slots in the stator and a total number of rotor poles may be selected in dependence on a predetermined condition, wherein the predetermined condition is a function of the mechanical shift angle and the rotor pole pitch.

The predetermined condition may require that the total number of slots and the total number of rotor poles correspond to a mechanical shift angle and a rotor pole pitch that satisfy a second equation, wherein the rotor pole pitch and the mechanical shift angle are variables of the second equation.

The second equation may comprise calculating a floor function of the mechanical shift angle divided by the rotor pole pitch, wherein the floor function rounds a product of the mechanical shift angle divided by the rotor pole pitch to a nearest integer less than or equal to the product to output a first condition value.

The second equation may further comprise multiplying the first condition value by the rotor pole pitch to output a second condition value.

The second equation may further comprise subtracting the second condition value from the mechanical shift angle to output a third condition value.

The predetermined condition may be satisfied if the third condition value is equal to a fraction of the rotor pole pitch.

The fraction of the rotor pole pitch may be a third of the rotor pole pitch or two thirds of the rotor pole pitch.

More specifically, the second equation may be defined as:

$$\left[\delta_{ph} - \text{floor}\left(\frac{\delta_{ph}}{\tau_p}\right)\tau_p\right] = \frac{\tau_p}{3} \text{ or } \frac{2\tau_p}{3}$$

where:
$\delta_{ph}$ is the mechanical shift angle;
$\tau_p$ is the rotor pole pitch; and $$\text{floor}\left(\frac{\delta_{ph}}{\tau_p}\right)$$

is a floor function that rounds the product of $$\left(\frac{\delta_{ph}}{\tau_p}\right)$$

to the nearest integer less than or equal to that product.

In preferred arrangements, the total number of slots in the stator is less than the total number of rotor poles.

In some arrangements, each phase comprises two elementary blocks being connected by a single end conductor. In such cases, each phase may be divided into two diametrically opposing zones, which act to balance the forces of the rotor and thereby reduce the amount of vibration and noise. Furthermore, the two elementary blocks of each phase may be configured provide separate power channels that act independently of one another, which is useful for achieving fault tolerant conditions where one channel is able to continue operating at full power if the other power channel fails.

In some arrangements, the stator may comprise three phases.

The rotor may comprise a plurality of permanent magnets.

The set of conductors may comprise a plurality of solid conductor bars. As noted above, the provision of solid conductor bars is achieved by grouping the concentrated windings of each phase into elementary blocks.

The rotor pole pitch may be equal to a stator slot pitch, the stator slot pitch being an angle between adjacent slots within each elementary block. As discussed above, this means that the slots within each elementary block align with the rotor poles to thereby maximise flux linkage and obtain a unit winding factor.

The angle between end slots of each pair of adjacent elementary blocks may be larger than an angle between adjacent slots within each elementary block. That is to say, the end slots of adjacent elementary blocks are further spaced apart than the slots within each elementary block.

The stator may comprise a plurality of stator teeth disposed between each of the plurality of slots, wherein a tooth disposed between each pair of adjacent elementary blocks is larger than a tooth disposed between adjacent slots within each elementary block.

In an alternative arrangement, each elementary block may comprise a plurality of slots arranged to house two conductors of the respective concentrated winding to define an inner layer and an outer layer, and wherein the stator further comprises a further intermediate slot arranged to house one conductor configured to provide a return path connecting the inner layer and the outer layer of each respective elementary block. That is to say, in a dual layer arrangement, a further intermediate slot may be located between adjacent elementary blocks, however, the conductor located therein merely provides a return path between the two layers and does not form part of the elementary block of concentrated windings itself.

The return path may be configured such that electric current travels along conductors in the inner layer in the same direction as conductors in the outer layer.

A further aspect of the present invention provides an aircraft propulsion system comprising an electrical machine as described above.

BRIEF DESCRIPTION OF THE DRAWINGS

Further features and advantages of the present invention will become apparent from the following description of embodiments thereof, presented by way of example only, and by reference to the drawings, wherein:

FIG. 8A is a flow diagram illustrating a method of calculating a winding arrangement according to the present invention;

DETAILED DESCRIPTION OF PREFERRED EMBODIMENTS

Figure 1:
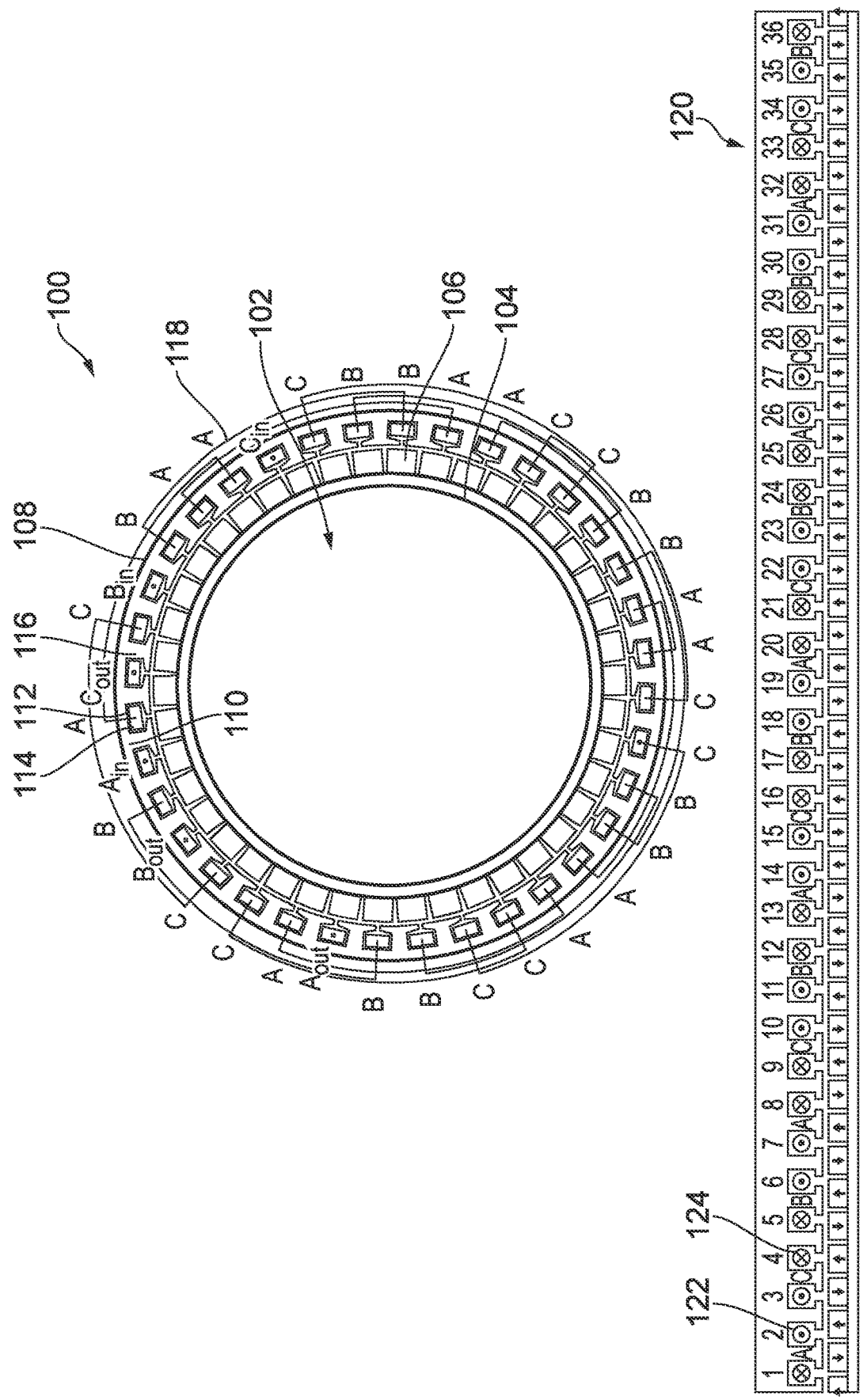
FIG. 1 is a diagram illustrating a prior art electrical machine with conventional concentrated windings.

FIG. 1 shows an example of a prior art three phase electrical machine 100 with a concentrated winding arrangement, comprising a rotor 102 and a stator 108. The rotor 102 comprises a rotating component 104, preferably in the form of a ferromagnetic back iron, the rotating component 104 being surrounded by an array of permanent magnets 106 distributed around its circumference. The number of poles that the electrical machine 100 has is equal to the number of permanent magnets 106 on the rotor 102. The stator 108 comprises a magnetic stator core 110, and plurality of longitudinal slots 112 distributed evenly around the circumference of the stator 108 and that extend through the stator core 110 in the direction of the longitudinal axis. The slots 112 are separated by a plurality of stator teeth 116. The stator 108 further comprises a plurality of concentrated windings for each of the three phases (denoted A, B and C). For each phase, a plurality of conductors 114 are wound around six pairs of adjacent slots 112 distributed evenly around the circumference of the stator 108, and connected together by the end windings 118. As can be seen from FIG. 1, this results in a complex network of end windings 118 in order to connect all of the coils of each phase (A, B and C). In the winding layout 120 of FIG. 1, a solid dot 122 represents a conductor that is arranged such that an electric current travels along the conductor(s) in a first direction (i.e. out of the page as seen in FIG. 1), whilst a cross 124 represents a conductor that is arranged such that an electric current travels along the conductor(s) in a second direction that is opposite the first direction (i.e. into the page as seen in FIG. 1). It will be appreciated that the meaning of these symbols applies to all of the winding layouts described and illustrated herein.

FIG. 1 shows a machine 100 having 36 slots and 42 poles, which is based on the basic winding structure of a machine having 12 slots and 14 poles, multiplied by a factor of 3. As such, in prior art concentrated windings, different winding arrangements can be determined by multiplying a basic slot and pole arrangement, for example, a 12 slot/14 pole or 9 slot/10 pole arrangement, by an integer number. This is not the case with the present invention, as will become apparent in the following description.

Figure 2:
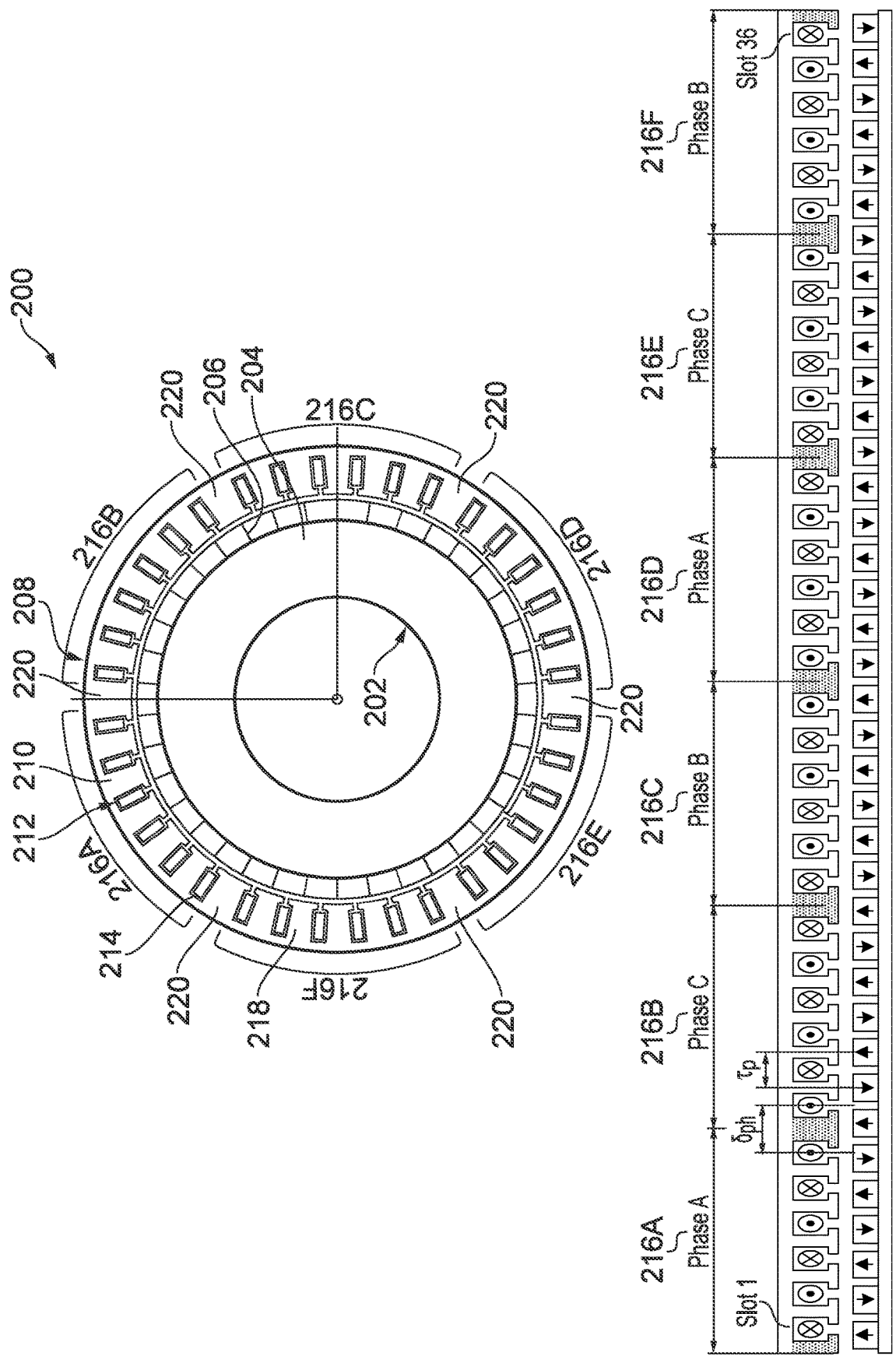
FIG. 2 is a diagram illustrating an electrical machine according to the present invention.
Figure 3:
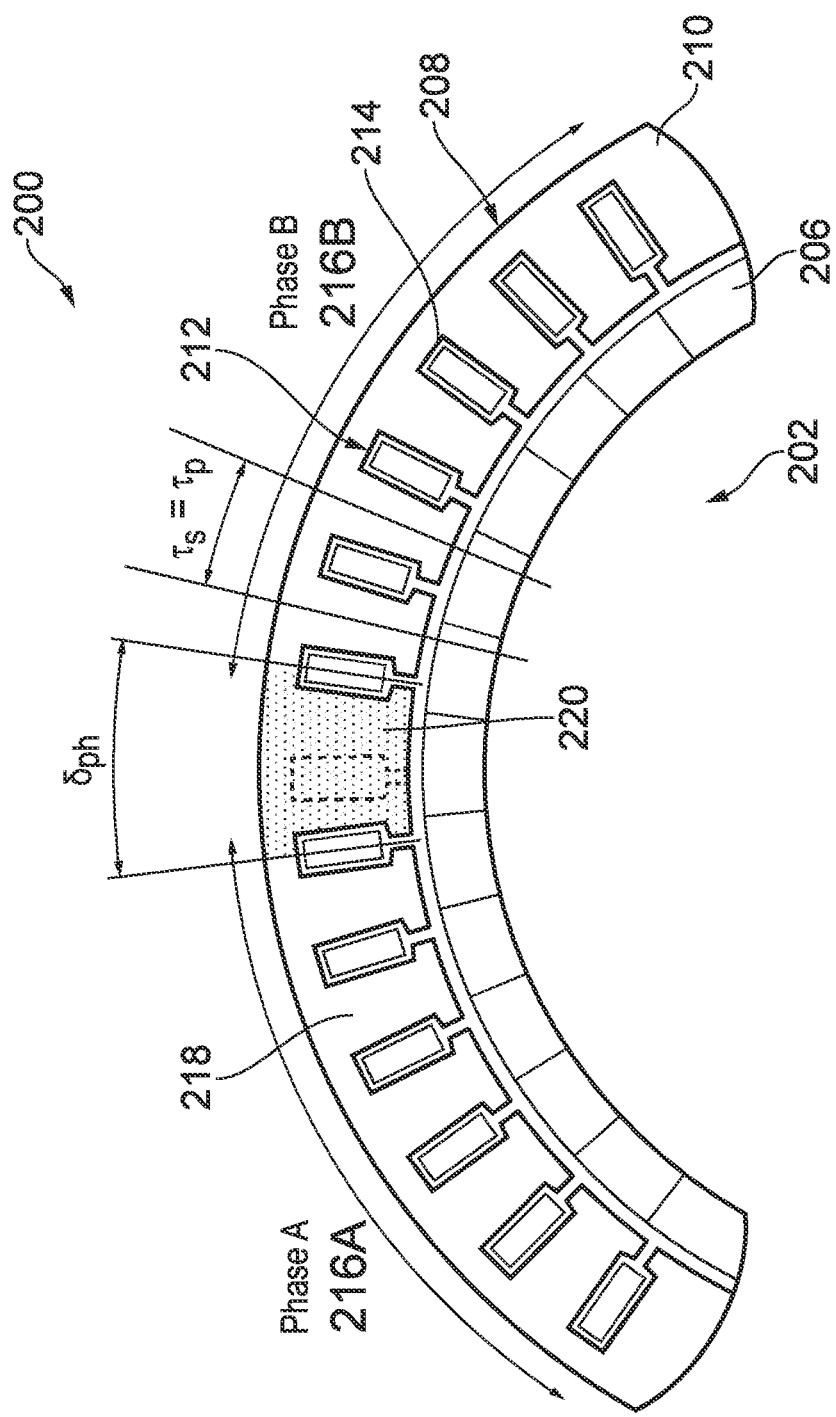
FIG. 3 is a further diagram illustrating an electrical machine according to the present invention.

FIGS. 2 and 3 illustrate one example of an electrical machine 200 according to the present invention, also comprising a rotor 202 and a stator 208. As before, the rotor 202 comprises a rotating component 204, preferably in the form of a ferromagnetic back iron, the rotating component 204 being surrounded by an array of permanent magnets 206 distributed around its circumference.

As described previously, the number of poles in the electrical machine is directly linked to the number of permanent magnets 206. The peripheral distance between the centres of two adjacent poles, that is, the angle between two adjacent rotor magnets 206, is referred to as the rotor pole pitch.

Specifically, the rotor pole pitch, $\tau_p$, is calculated by:

$$\tau_p = \frac{360}{2p} \quad [1]$$

Where:
2p is the total number of poles in the rotor.

Here, it will be appreciated that p refers to the number of pole pairs. In the example shown in FIG. 2, the rotor 202 comprises 38 permanent magnets 206, that is to say, the total number of poles is 38.

As before, the stator 208 comprises a magnetic stator core 210, and plurality of longitudinal slots 212 that extend through the stator core 210 in the direction of the longitudinal axis. In the example shown in FIG. 2, the stator 208 comprises 36 slots 212. The stator 208 further comprises a plurality of concentrated windings for each of the three phases (denoted A, B and C), as further shown in the winding layout 222 of FIG. 2. For each phase, the windings are grouped such that a plurality of conductors 214 are wound around the slots 212 to form two elementary blocks 216A-216F of concentrated windings, with each slot 212 being configured to receive a single conductor 214, known as a single layer winding. In this example, the conductors 214 for phase A are wound around the slots 212 in the blocks denoted 216A and 216D, the conductors 214 for phase B are wound around the slots 212 in the blocks denoted 216C and 216F, and the conductors 214 for phase C are wound around the slots 212 in the blocks denoted 216B and 216E. As such, each phase has been divided into two diametrically opposing zones, which in turn has the effect of balancing the forces of the rotor 202, thereby reducing the amount of vibration and noise. Similarly, the two distinct zones of each phase may be used to provide separate power channels that act independently of one another. This is important for redundancy and achieving fault tolerant conditions whereby one power channel is able to continue operating at full power if the other power channel fails. Furthermore, this arrangement enables the use of solid bar conductors due to the fact that only a single jump is required between the end windings of the two elementary blocks 216A-216F for each phase.

Within each elementary block 216A-216F, the slots 212 are separated by a plurality of stator teeth 218 of a first size, such that the slot pitch, $\tau_s$, that is, the angle between adjacent slots 212, is equal to the rotor pole pitch, $\tau_p$, as illustrated in FIG. 3. This ensures that the whole of the flux generated from the rotor 202 is linking with the coils formed by the windings in the stator 208, that is to say, the flux linkage is maximized, and consequently the winding factor is equal to one. This perfect alignment is impossible to obtain with the conventional concentrated winding, and consequently the winding factor will always be less than one. Indeed, the highest fundamental winding factor for the three phase single-layer conventional concentrated winding is 0.966. For example, an electrical machine having 12 slots and 14 poles and having a conventional concentrated winding arrangement, the basic winding structure upon which the example of FIG. 1 is based, has a winding factor of 0.966 for single layer and 0.933 for double layer. In contrast, an electrical machine having 12 slots and 14 poles based on the new winding arrangement described herein has a unit winding factor.

The adjacent elementary blocks of the winding, 216A-216F, are mechanically shifted by an angle, $\delta_{ph}$, as illustrated in FIG. 3. The angle $\delta_{ph}$ is larger than the rotor pole pitch and the slot pitch within the elementary blocks 216A-216F in order to accommodate the 120° electrical shift between the three phases. In this example, this is achieved by the provision of a large tooth 220 between the end slots of adjacent elementary blocks 216A-216F. Consequently, in this arrangement, the number of slots is always lower than the number of poles.

In more detail, the mechanical shift angle, $\delta_{ph}$, is calculated by:

$$\delta_{ph} = \frac{360 - \tau_p(N_{slot} - n)}{n} \quad [2]$$

where:
$N_{slot}$ is the total number of slots 212 in the stator 208;
n is the number of elementary blocks 216A-216F in the stator 208, equal to 3 or 6; and
$\tau_p$ is the rotor pole pitch.

The closer the number of slots 212, $N_{slot}$, is to the number of poles, 2p, the higher the machine performance. For example, a machine having 36 slots and 38 poles, such as that shown in FIG. 2, will perform slightly better than a machine having 36 slots and 40 poles, as will be described in reference to FIG. 4 below. Conversely, as the mechanical shift angle between the blocks 216A-216F, $\delta_{ph}$, increases, performance can decrease.

Therefore, the number of slots 212 and the number of poles 206 must be selected such that for a given ($N_{slot}$, 2p), with $N_{slot}$ being smaller than 2p, the following condition must be fulfilled:

$$\left[\delta_{ph} - \text{floor}\left(\frac{\delta_{ph}}{\tau_p}\right)\tau_p\right] = \frac{\tau_p}{3} \text{ or } \frac{2\tau_p}{3} \qquad [3]$$

where:
$\delta_{ph}$ is the mechanical shift angle;
$\tau_p$ is the rotor pole pitch; and $$\text{floor}\left(\frac{\delta_{ph}}{\tau_p}\right)$$

is a floor function that rounds the value of $$\left(\frac{\delta_{ph}}{\tau_p}\right)$$

to the nearest integer less than or equal to that element.

Taking the electrical machine 200 shown in FIG. 2 as an example, comprising 36 slots 212 and 38 permanent magnets 206, and having six elementary blocks, n=6.

$$\tau_p = \frac{360}{38} = 9.47° \qquad [4]$$

$$\delta_{ph} = \frac{360 - \frac{360}{38}(36-6)}{6} = 12.63° \qquad [5]$$

$$\left[\delta_{ph} - \text{floor}\left(\frac{\delta_{ph}}{\tau_p}\right)\tau_p\right] = \left[12.63 - \text{floor}\left(\frac{12.63}{9.47}\right)9.47\right] = 3.16° \qquad [6]$$

$$\frac{\tau_p}{3} = 3.16° \qquad [7]$$

As such, since in the above example $\tau_p$=9.47°; and $\tau_p/3$ (rounded to 2 decimal places) gives the same result as equation [6], this number of poles and slots is feasible.

Figure 8B:
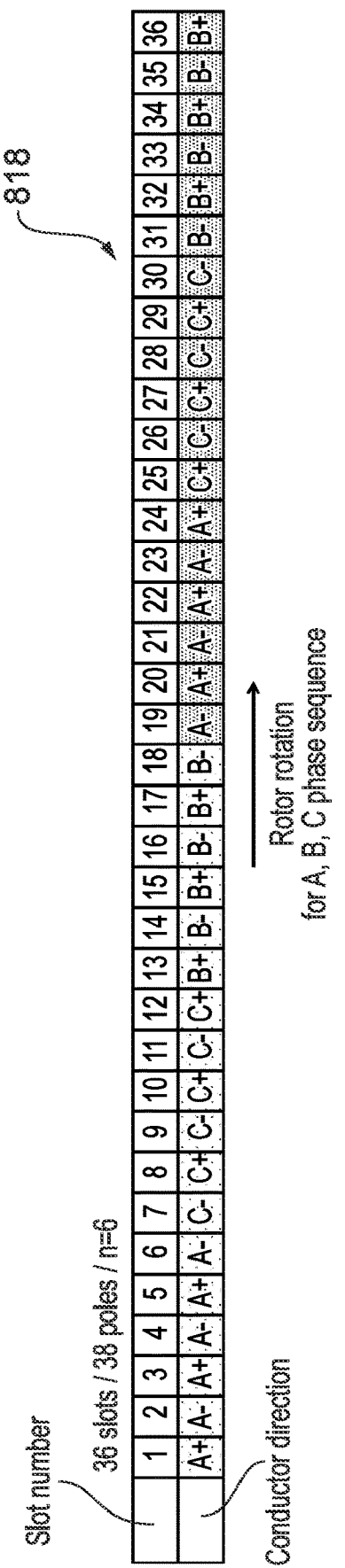
FIG. 8B illustrates an example of a winding arrangement according to the present invention.

Having determined that a given number of rotor magnets and slots is feasible according to the above method of calculation, the specific winding layout can then be determined. In order to determine the winding layout of an electrical machine according to the present method, a series of calculations are used to evaluate the winding arrangement required for a given number of slots and poles in order to accommodate the 120° electrical shift between the three phases, as will now be described. FIG. 8A illustrates the method 800 of determining the winding layout in the case of six elementary blocks (n=6). Here, it can be seen that the method 800 comprises a series of calculating steps 802, 806, 810, 814 using the rotor pole pitch, $\tau_p$, of the given number of rotor magnets to determine the required winding layout 804, 808, 812, 816 based on the number of slots. In one example, for a machine having six elementary blocks, n=6, the calculating steps 802, 806, 810, 814 are based on the condition that the 120° electrical phase shift between the three phases is maintained, with each block spanning over a mechanical angle of 60°. Taking the example of FIG. 2, wherein the electrical machine 200 comprises 36 slots 212 and 38 rotor magnets 206, it can be seen that the rotor pole pitch fulfils the first calculation 802 as follows:

$$\tau_p = \frac{360}{38} = 9.47° \qquad [8]$$

$$\left[60 - \text{floor}\left(\frac{60}{2\tau_p}\right)2\tau_p\right] = \left[60 - \text{floor}\left(\frac{60}{2\left(\frac{360}{38}\right)}\right)2\left(\frac{360}{38}\right)\right] = 3.16° \qquad [9]$$

$$\frac{\tau_p}{3} = 3.16° \qquad [10]$$

The number of slots 212 is then used to determine the winding layout 804, which ensures that the correct electrical shift between the three phases A, B and C is obtained for the given number of slots and poles. In the case of FIG. 2, comprising 36 slots 212, the resulting configuration requires that each elementary block comprises 6 slots 212, as further illustrated by the winding layout 818 shown in FIG. 8B.

Figure 4:
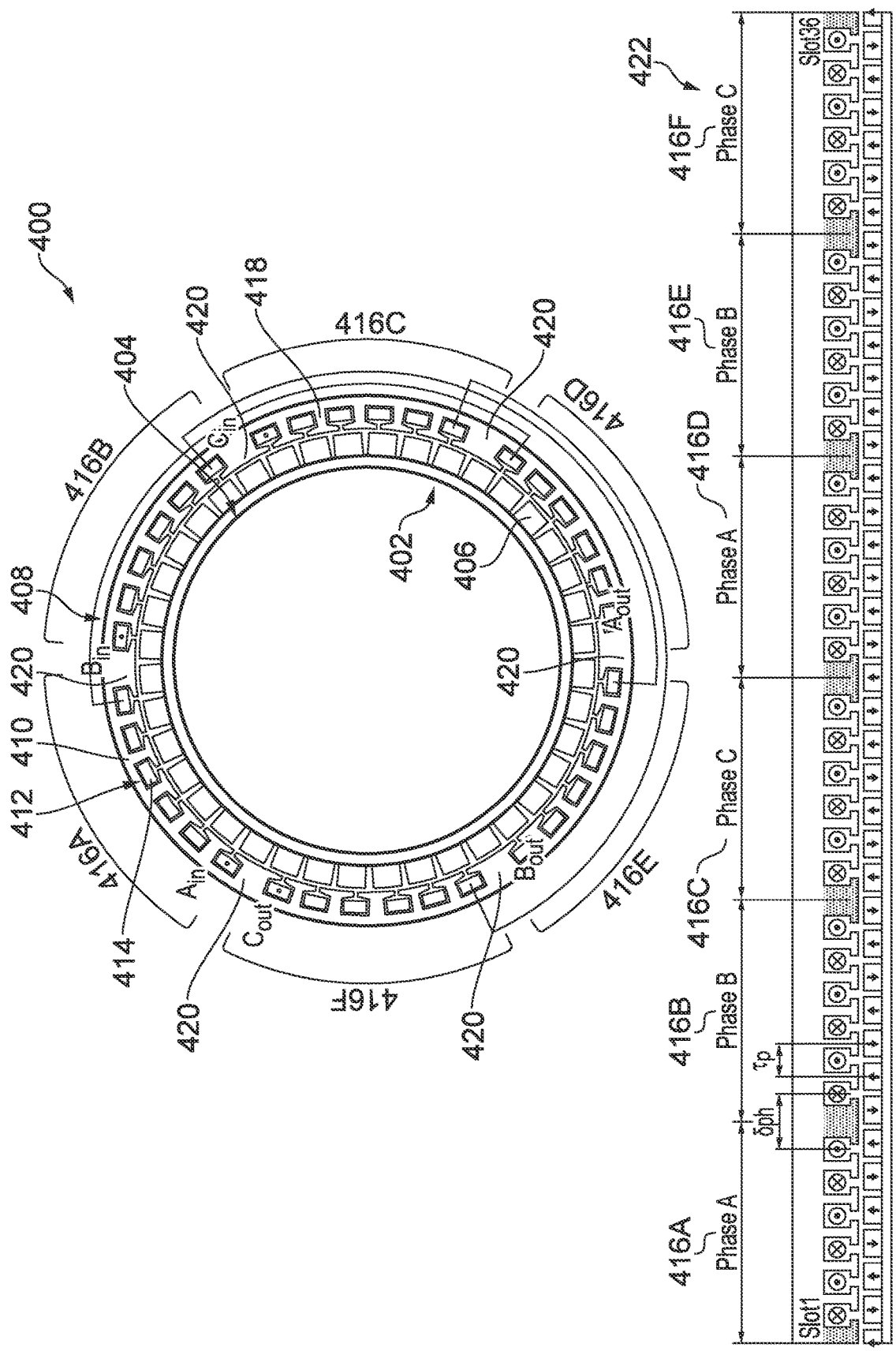
FIG. 4 is a further diagram illustrating an electrical machine according to the present invention.

FIG. 4 illustrates a further example of an electrical machine 400 according to the present invention, also comprising a rotor 402 and a stator 408. As before, the rotor 402 comprises a rotating component 404, preferably in the form of a ferromagnetic back iron, the rotating component 404 being surrounded by an array of permanent magnets 406 distributed around the circumference of the rotor.

As before, the stator 408 comprises a magnetic stator core 410, and plurality of longitudinal slots 412 that extend through the stator core 410 in the direction of the longitudinal axis. The stator 408 further comprises a plurality of concentrated windings for each of the three phases (denoted A, B and C), as further shown in the winding layout 422. For each phase, the windings are grouped such that a plurality of conductors 414 are wound around the slots 412 to form two elementary blocks 416A-416F of concentrated windings, with each slot 412 being configured to receive a single conductor 414, known as a single layer winding. In this example, the conductors 414 for phase A are wound around the slots 412 in the blocks denoted 416A and 416D, the conductors 414 for phase B are wound around the slots 412 in the blocks denoted 416B and 416E, and the conductors 414 for phase C are wound around the slots 412 in the blocks denoted 416C and 416F. As with the example of FIG. 2, each phase has been divided into two diametrically opposing zones, which in turn has the effect of balancing the forces of the rotor 402 and thereby reduce the amount of vibration and noise. In this example, the machine 400 comprises 36 slots 412 and 40 permanent magnets 406.

As before, the feasibility of the slot number and pole number can be verified using equations [1] to [3] above. The electrical machine 400 of FIG. 4 comprises 36 slots 412, 40 permanent magnets 406, and six elementary blocks, n=6.

$$\tau_p = \frac{360}{40} = 9° \qquad [11]$$

$$\delta_{ph} = \frac{360 - 9(36-6)}{6} = 15° \qquad [12]$$

$$\left[\delta_{ph} - \text{floor}\left(\frac{\delta_{ph}}{\tau_p}\right)\tau_p\right] = \left[15 - \text{floor}\left(\frac{15}{9}\right)9\right] = 6° \qquad [13]$$

-continued $$\frac{2\tau_p}{3} = 6° \quad [14]$$

As such, since in the above example $\tau_p=9°$; and $2\tau_p/3$ gives the same result as equation [13], this number of poles and slots is feasible for.

As before, having determined that the given number of rotor magnets and slots is feasible, the specific winding arrangement can then be determined using the method 800 illustrated by FIG. 8A. In the example of FIG. 4, wherein the electrical machine 400 comprises 36 slots 412 and 40 rotor magnets 406, it can be seen that the rotor pole pitch fulfils the second calculation 806 as follows:

$$\tau_p = \frac{360}{40} = 9° \quad [15]$$

$$\left[60 - \text{floor}\left(\frac{60}{2\tau_p}\right)2\tau_p\right] = \left[60 - \text{floor}\left(\frac{60}{2(9)}\right)2(9)\right] = 6° \quad [16]$$

$$\frac{2\tau_p}{3} = 6° \quad [17]$$

The total number of slots 412 is then used to determine the winding layout 808, ensuring that the correct electrical shift between the three phases A, B and C is obtained for the given number of slots and poles. In the case of FIG. 4, comprising 36 slots 412, the resulting configuration requires that each elementary block comprises 6 slots 412, as illustrated by winding layout 422.

Figure 5:
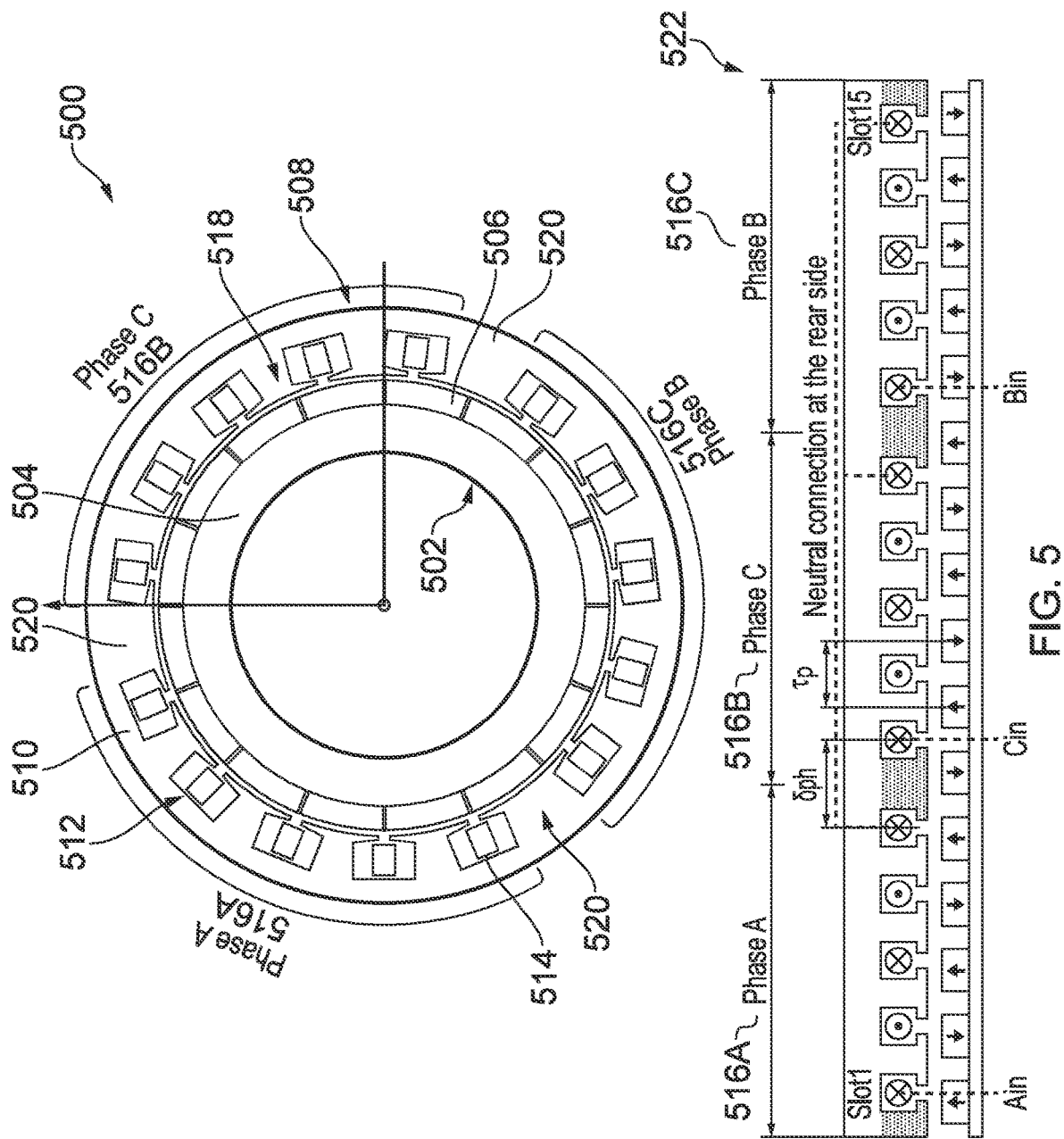
FIG. 5 is a diagram illustrating an electrical machine according to the present invention.

FIG. 5 illustrates a further example of an electrical machine 500 according to the present invention, also comprising a rotor 502 and a stator 508. As before, the rotor 502 comprises a rotating component 504, preferably in the form of a ferromagnetic back iron, the rotating component 504 being surrounded by an array of permanent magnets 506 distributed around its circumference. In this example, rotor 502 comprises 16 permanent magnets 506.

As before, the stator 508 comprises a magnetic stator core 510, and plurality of longitudinal slots 512 that extend through the stator core 510 in the direction of the longitudinal axis. In this example, the stator 508 comprises 15 slots 512, and each slot 512 is configured to receive a single conductor 514. The stator 508 further comprises a plurality of concentrated windings for each of the three phases (denoted A, B and C), as further shown in the winding layout 522. For each phase, the windings have again been grouped, however, in this example the conductors 514 for each phase are wound around the slots 512 to form a single elementary block 516A-516C of concentrated windings. In more detail, the conductors 514 for phase A are wound around the slots 512 in the block denoted 516A, the conductors 514 for phase B are wound around the slots 512 in the block denoted 516C, and the conductors 514 for phase C are wound around the slots 512 in the block denoted 516B. This arrangement, with n=3, is particularly advantageous for the use of solid bar conductors since there are no jumps between the parts of each phase since they are all grouped in a single elementary block 516A-516C.

Furthermore, for an odd number of slots 512, the neutral connection could be moved to the back of the machine (as seen in FIG. 5) and the front side (as seen in FIG. 5) will have only the winding terminals (power supply bars). This is different from prior art arrangements, because in any conventional winding, the neutral connection and the winding terminals are located at the same longitudinal end (e.g. the 'front side' as shown in FIG. 5) of the core 510, which leads to bulky and unbalanced end windings.

Within each elementary block 516A-516C, the slots 512 are separated by a plurality of stator teeth 518 of a first size, wherein the slot pitch, $\tau_s$, is equal to the rotor pole pitch, $\tau_p$. As with the examples shown in FIGS. 2 to 4, in order to group the concentrated windings of each phase in this way, the mechanical shift angle, $\delta_{ph}$, between the concentrated windings of adjacent elementary blocks 516A-516C is larger than the rotor pole pitch and the slot pitch within the elementary blocks 516A-516C. In this example, this is again achieved by the provision of a large tooth 520 between the end slots of adjacent elementary blocks 516A-516C.

As before, the feasibility of the slot number and pole number can be verified using equations [1] to [3] above. The electrical machine 500 of FIG. 5 comprises 15 slots 512, 16 permanent magnets 506, and three elementary blocks, n=3.

$$\tau_p = \frac{360}{16} = 22.5° \quad [18]$$

$$\delta_{ph} = \frac{360 - 22.5(15 - 3)}{3} = 30° \quad [19]$$

$$\left[\delta_{ph} - \text{floor}\left(\frac{\delta_{ph}}{\tau_p}\right)\tau_p\right] = \left[30 - \text{floor}\left(\frac{30}{22.5}\right)22.5\right] = 7.5° \quad [20]$$

$$\frac{\tau_p}{3} = 7.5° \quad [21]$$

As such, since in the above example $\tau_p=22.5°$; and $\tau_p/3$ gives the same result as equation [20], this number of poles and slots is feasible.

Figure 9A:
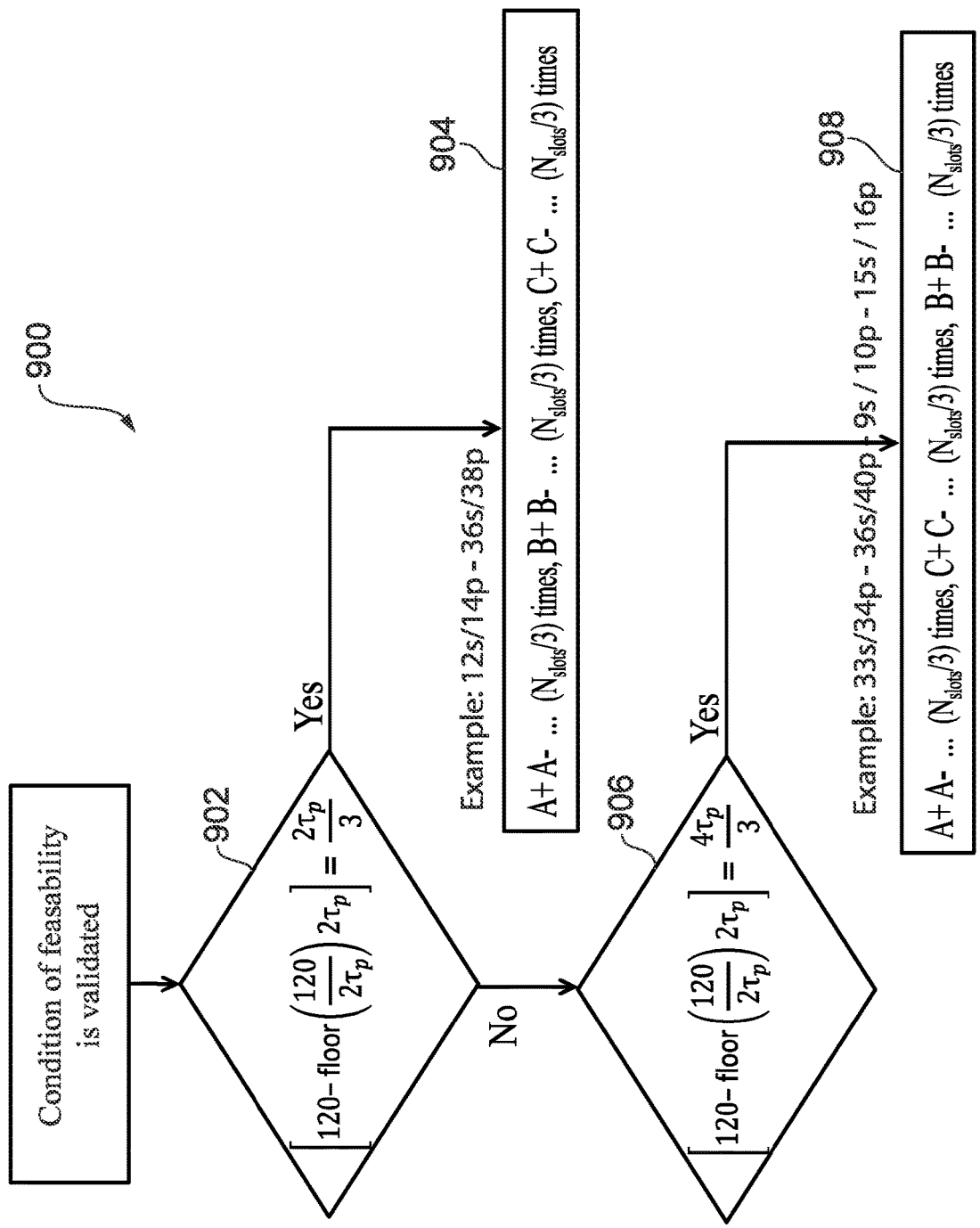
FIG. 9A is a flow diagram illustrating a method of calculating a winding arrangement according to the present invention.

Having determined that the given number of rotor magnets and slots is feasible, the specific winding arrangement, required for a given number of slots and poles in order to accommodate the 120° electrical shift between the three phases, can then be determined using the method 900 illustrated by FIG. 9A. FIG. 9A illustrates the method 900 of determining the winding layout in the case of three elementary blocks, n=3. Here, it can be seen that the method 900 comprises a series of calculating steps 902, 906 using the rotor pole pitch, $\tau_p$, of the given number of rotor magnets to determine the required winding layout 904, 908 based on the number of slots. For a machine having three elementary blocks, n=3, the calculating steps 902, 906 are again based on the condition that the 120° electrical phase shift between the three phases is maintained, with each block spanning over a mechanical angle of 120°. In the example of FIG. 5, wherein the electrical machine 500 comprises 15 slots 512 and 16 rotor magnets 506, it can be seen that the rotor pole pitch fulfils the second calculation 906 as follows:

$$\tau_p = \frac{360}{16} = 22.5° \quad [21]$$

$$\left[120 - \text{floor}\left(\frac{120}{2\tau_p}\right)2\tau_p\right] = \left[120 - \text{floor}\left(\frac{120}{2(22.5)}\right)2(22.5)\right] = 30° \quad [22]$$

$$\frac{4\tau_p}{3} = 30° \quad [23]$$

Figure 9B:
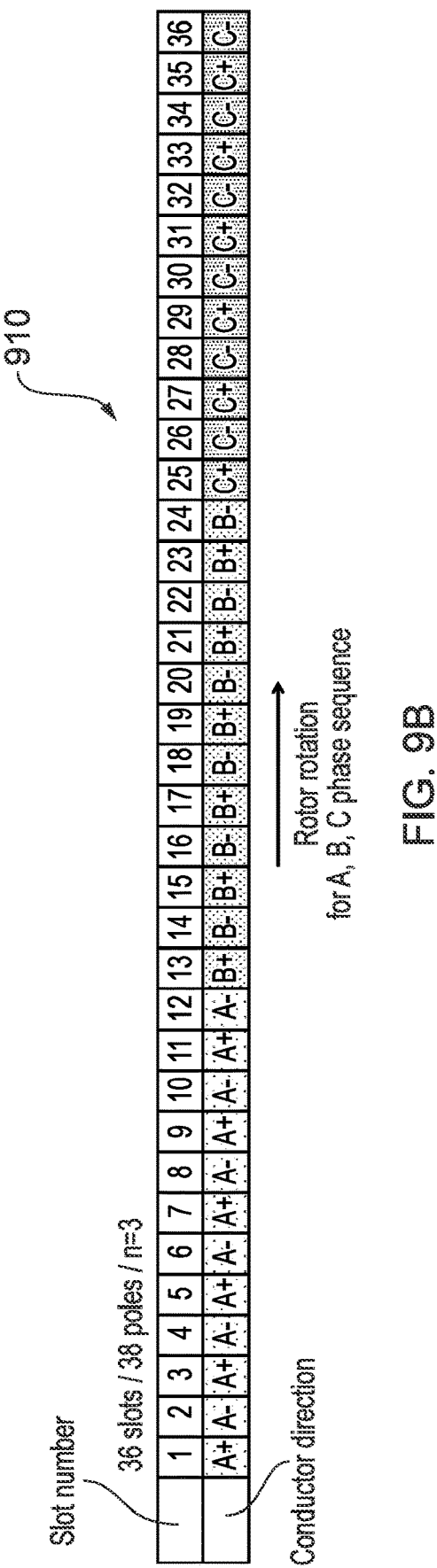
FIG. 9B illustrates an example of a winding arrangement according to the present invention.

The total number of slots 512 can then be used to determine the winding layout 908, ensuring that the correct electrical shift between the three phases A, B and C is obtained for the given number of slots and poles. In the case of FIG. 5, comprising 15 slots 412, the resulting configuration requires that each elementary block comprises 5 slots 412, as illustrated by winding layout 522. A further example of a winding arrangement 910 having three elementary blocks, n=3, and determined using the method of FIG. 9A is shown by FIG. 9B.

In the arrangements described above, a single layer winding arrangement is implemented. However, it will be appreciated by the skilled person that the same concept may be extended to a double layer winding arrangement, in which the slots of the stator are configured to receive two conductors, as illustrated by FIGS. 6 and 7.

Figure 6:
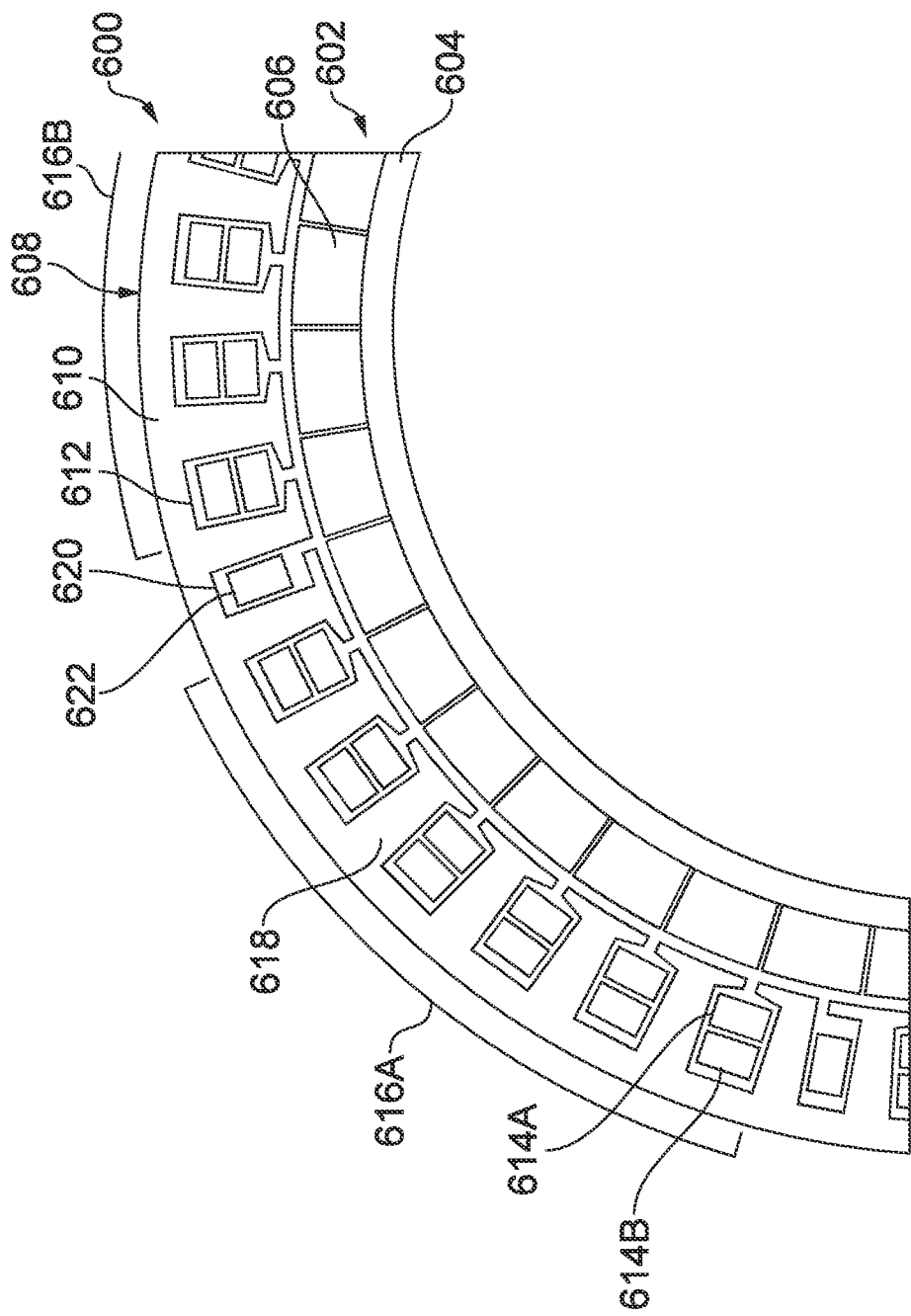
FIG. 6 is a diagram illustrating an electrical machine according to the present invention.
Figure 7:
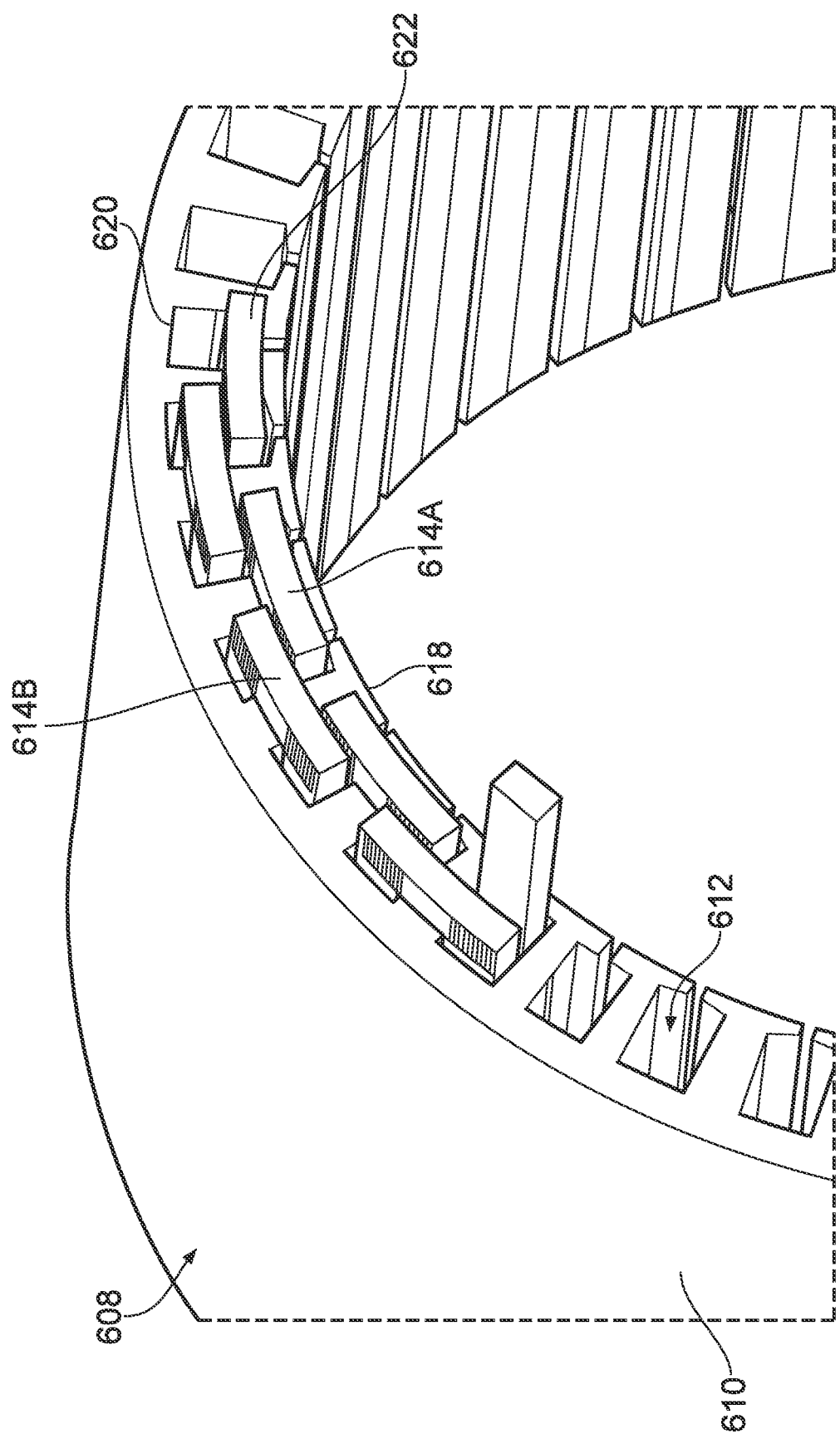
FIG. 7 is a further diagram illustrating an electrical machine according to the present invention.

FIGS. 6 and 7 illustrate how the present invention may be implemented with a double layer winding configuration. In this example, an electrical machine 600 comprises a rotor 602 and a stator 608. As before, the rotor 602 comprises a rotating component 604 surrounded by an array of permanent magnets 606 distributed around the circumference of the rotor 602. The stator 608 comprises a magnetic stator core 610, and plurality of longitudinal slots 612 that extend through the stator core 610 in the direction of the longitudinal axis. The stator 608 further comprises a plurality of concentrated windings for each of the three phases (denoted A, B and C). For each phase, the windings have again been grouped such that the conductors 614 are wound around the slots 612 to form elementary blocks 616A-B of concentrated windings. Only one full block 616A is shown, however, it will be appreciated that each phase may comprise one or two elementary blocks of concentrated windings, as described above. For example, the machine 600 may comprises six elementary blocks in total.

In this example, each slot 612 is configured to receive two conductors 614A-B forming a set of inner layer conductors 614A and a set of outer layer conductors 614B. Each large tooth between two elementary blocks comprises a supplementary slot 620 for receiving a single return conductor 622 in order to connect the inner layer conductors 614A to the outer layer conductors 614B. In this respect, the inner layer conductors 614A, return conductor 622 and outer layer conductors 614B are connected such that electric current flows along the inner layer conductors 614A, past the return conductor 622 and then along the outer layer conductors 614B, with the current flowing in the same direction within each slot 612.

In the previous examples, the large tooth located between end slots of adjacent blocks was effectively inactive. In the present example, the additional slot 620 comprising the return conductor 622 has the effect of rendering this region of the large tooth active because the current flowing in the conductor 622 also contributes to the creation of the torque. However, the mechanical shift angle, $\delta_{ph}$, is still defined as the angle between the end slots of adjacent elementary blocks 616A, 616B, and the equations [1]-[3] for determining the feasibility of the number of slots and rotor magnets apply in the same way as the examples described above. As such, the number of slots, $N_{slot}$, does not include the additional slot 620 located in the region of the large tooth. Likewise, the methods shown in FIGS. 8A and 9A for determining the winding arrangement also apply to the double layer arrangement in substantially the same way.

In the arrangements described above, where the number of slots, $N_{slot}$, is smaller than the total number of rotor poles, 2p, the required electric shift is achieved through the provision a large tooth between the end slots of elementary blocks, which may or may not comprise a supplementary slot depending on whether the machine has a single or double layered winding configuration. Such arrangements are advantageous in that it offers more flexibility in terms of the possible combinations of ($N_{slot}$, 2p). That is to say, for a given number of slots, there are many solutions with different numbers of poles, and vice versa. For example, a machine having $N_{slot}$=36, 2p=38, 40, 44, 46 and so on. Although, as discussed previously, the closer the number of slots, $N_{slot}$, is to the number of poles, 2p, the higher the machine performance. To achieve the best performance in terms of torque density (Nm/kg), the optimal arrangement is a machine having $N_{slot}$=2p-1 for n=3 and $N_{slot}$=2p-2 for n=6.

All of the arrangements described above relate to a machine having three phases, however, it will be appreciated that the present invention may be extended to a machine having a number of phases greater than three. For example, a six phase machine may comprise six elementary blocks, that is, one block for each phase, with each corresponding to a 60° mechanical angle. Alternatively, a six phase machine may comprise twelve elementary blocks, that is, two blocks for each phase, with each corresponding to a 30° mechanical angle. As such, it follows that whilst the arrangements described herein relate to a machine having three or six elementary blocks, it will be appreciated that the present invention may also be extended to a machine that comprises a number of elementary blocks, n, greater than 6.

Figure 10:
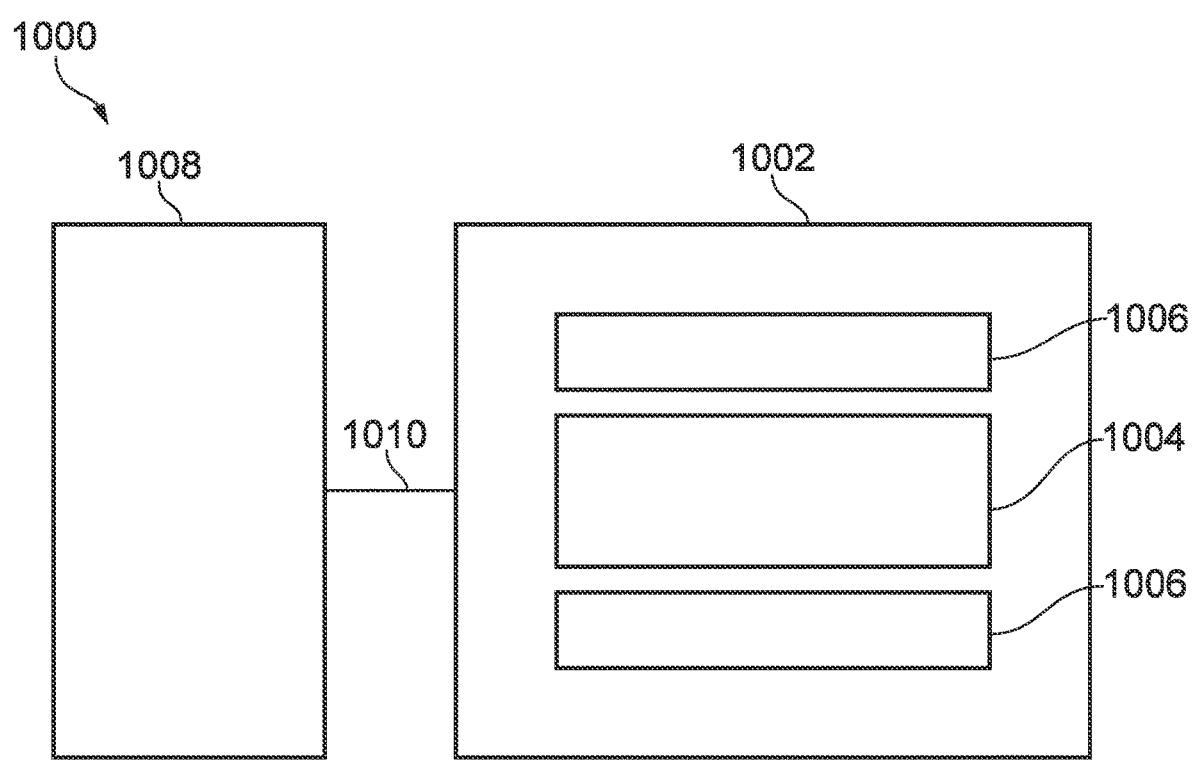
FIG. 10 is a schematic of an aircraft propulsion system comprising an electrical machine according to the present invention.

FIG. 10 illustrates an example of a full-electric or hybrid-electric aircraft propulsion system 1000 comprising an electrical machine 1002 as described herein. The electrical machine 1002 comprises a rotor 1004 and a stator 1006 according to the arrangements described above. In this respect, the stator 1006 has a concentrated winding configuration, wherein the coils corresponding to each phase are arranged into elementary blocks that are separated by a mechanical shift angle that is greater than the rotor pole pitch. The electrical machine 1002 is connected to an aircraft propeller 1008 by means of a rotating shaft 1010, wherein the electric motor 1002 drives the shaft 1010 to thereby drive the propeller 1008.

In the context of a full electric or hybrid-electric aircraft, the electrical machine described herein may be used in a propulsive system, wherein the electric motors driving the propellers of the aircraft by converting the electrical power, supplied by electrical generators driven by a turboshaft or given by the battery, to a mechanical power (torque).

Various modifications, whether by way of addition, deletion and/or substitution, may be made to all of the above described embodiments to provide further embodiments, any and/or all of which are intended to be encompassed by the appended claims.

The invention claimed is:

1. An electrical machine for use in an aircraft, comprising:
   a rotor, wherein the rotor comprises a plurality of rotor poles; and
   a stator comprising a plurality of phases, wherein each respective phase occupies at least one elementary block, the at least one elementary block of each phase comprising a set of conductors of the respective phase wound around a plurality of slots of the respective elementary block in a concentrated winding configuration;
   wherein a mechanical shift angle between the respective concentrated windings of each pair of adjacent elementary blocks is greater than a rotor pole pitch, the rotor pole pitch being an angle between adjacent poles of the rotor; and
   wherein each elementary block comprises a plurality of slots arranged to house two conductors of the respective concentrated winding to define an inner layer and an outer layer, and wherein the stator further comprises a further intermediate slot arranged to house one conductor configured to provide a return path connecting the inner layer and the outer layer of each respective elementary block.

2. The electrical machine according to claim 1, wherein the mechanical shift angle is defined by a function of the rotor pole pitch, a total number of slots in the stator, and a number of elementary blocks in the stator.

3. The electrical machine according to claim 2, wherein the mechanical shift angle is calculated using a first equation comprising a multiplier and a denominator, wherein the rotor pole pitch, the total number of slots in the stator, and the number of elementary blocks in the stator are variables of the first equation, wherein the multiplier is defined as: the number of elementary blocks subtracted from the total number of slots to output a first multiplier value, the first multiplier value being multiplied by the rotor pole pitch to output a second multiplier value, the second multiplier value being subtracted from a constant.

4. The electrical machine according to claim 3, wherein the denominator is the number of elementary blocks.

5. The electrical machine according to claim 2, wherein the mechanical shift angle, $\delta_{ph}$, is calculated by:

$$\delta_{ph} = \frac{360 - \tau_p(N_{slot} - n)}{n}$$

where:
$N_{slot}$ is the total number of slots in the stator;
n is the number of elementary blocks in the stator; and
$T_p$ is the rotor pole pitch.

6. The electrical machine according to claim 2, wherein the total number of elementary blocks, n, is equal to 3 or 6.

7. The electrical machine according to claim 2, wherein the total number of slots in the stator and a total number of rotor poles are selected in dependence on a predetermined condition, wherein the predetermined condition is a function of the mechanical shift angle and the rotor pole pitch.

8. The electrical machine according to claim 7, wherein the predetermined condition requires that the total number of slots and the total number of rotor poles correspond to a mechanical shift angle and a rotor pole pitch that satisfy a second equation, wherein the rotor pole pitch and the mechanical shift angle are variables of the second equation, wherein the second equation comprises calculating a floor function of the mechanical shift angle divided by the rotor pole pitch, wherein the floor function rounds a product of the mechanical shift angle divided by the rotor pole pitch to a nearest integer less than or equal to the product to output a first condition value.

9. The electrical machine according to claim 8, wherein the second equation further comprises multiplying the first condition value by the rotor pole pitch to output a second condition value, wherein the second equation further comprises subtracting the second condition value from the mechanical shift angle to output a third condition value, wherein the predetermined condition is satisfied if the third condition value is equal to a fraction of the rotor pole pitch, and wherein the fraction of the rotor pole pitch is a third of the rotor pole pitch or two thirds of the rotor pole pitch.

10. The electrical machine according to claim 8, wherein the second equation is defined as:

$$\left[\delta_{ph} - \text{floor}\left(\frac{\delta_{ph}}{\tau_p}\right)\tau_p\right] = \frac{\tau_p}{3} \text{ or } \frac{2\tau_p}{3}$$

where:
$\delta_{ph}$ is the mechanical shift angle;
$T_p$ is the rotor pole pitch; and $$\text{floor}\left(\frac{\delta_{ph}}{\tau_p}\right)$$

is a floor function that rounds the product of $$\left(\frac{\delta_{ph}}{\tau_p}\right)$$

to the nearest integer less than or equal to that product.

11. The electrical machine according to claim 7, wherein the total number of slots in the stator is less than the total number of rotor poles.

12. The electrical machine according to claim 1, wherein each phase comprises two elementary blocks being connected by a single end conductor.

13. The electrical machine according to claim 1, wherein the stator comprises three phases.

14. The electrical machine according to claim 1, wherein the rotor comprises a plurality of permanent magnets.

15. The electrical machine according to claim 1, wherein the set of conductors comprises a plurality of solid conductor bars.

16. The electrical machine according to claim 1, wherein the rotor pole pitch is equal to a stator slot pitch, the stator slot pitch being an angle between adjacent slots within each elementary block.

17. The electrical machine according to claim 1, wherein the return path is configured such that electric current travels along conductors in the inner layer in the same direction as conductors in the outer layer.

18. An aircraft propulsion system comprising an electrical machine according to claim 1.

* * * * *